United States Patent
Planke et al.

(10) Patent No.: US 7,221,620 B2
(45) Date of Patent: May 22, 2007

(54) APPARATUS FOR SEISMIC MEASUREMENTS

(76) Inventors: Sverre Planke, Arnebratveien 30C, Oslo (NO) N-0771; Christian Berndt, 32 Denmark Rd, Cowes, Isle of Wight (GB) PO31 7SZ ( * ) Notice: Subject to any disclaimer, the term of this patent is extended or adjusted under 35 U.S.C. 154(b) by 0 days.

(21) Appl. No.: 10/506,897

(22) PCT Filed: Mar. 6, 2003

(86) PCT No.: PCT/NO03/00079

§ 371 (c)(1),
(2), (4) Date: Apr. 15, 2005

(87) PCT Pub. No.: WO03/075039

PCT Pub. Date: Sep. 12, 2003

(65) Prior Publication Data

US 2005/0180260 A1    Aug. 18, 2005

(30) Foreign Application Priority Data

Mar. 7, 2002    (NO) ................................ 20021140

(51) Int. Cl.
*G01V 1/38*    (2006.01)
(52) U.S. Cl. .................... 367/20; 367/15; 114/253
(58) Field of Classification Search ............ 367/15–20, 367/153–154; 114/246, 253
See application file for complete search history.

(56) References Cited

U.S. PATENT DOCUMENTS

| 3,414,874 | A | * | 12/1968 | McLoad ..................... 367/20 |
| 3,581,272 | A | | 5/1971 | Yopp et al. |
| 4,781,140 | A | * | 11/1988 | Bell et al. .................... 367/15 |
| 4,831,599 | A | * | 5/1989 | Dragsund et al. ............. 367/15 |
| 4,958,331 | A | | 9/1990 | Wardle |
| 4,970,696 | A | | 11/1990 | Crews et al. |
| 5,835,450 | A | * | 11/1998 | Russell ........................ 367/20 |
| 5,913,280 | A | * | 6/1999 | Nielsen et al. ................ 367/16 |
| 5,973,995 | A | * | 10/1999 | Walker et al. ................ 367/20 |

(Continued)

FOREIGN PATENT DOCUMENTS

WO    01/16623    3/2001

OTHER PUBLICATIONS

Amundsen, Lasse. "Linear inversion for source signatures from ministreamer data." The Leading Edge, Jan. 2000.*

*Primary Examiner*—Jack Keith
*Assistant Examiner*—Scott A. Hughes
(74) *Attorney, Agent, or Firm*—Young & Thompson

(57) ABSTRACT

An apparatus for three-dimensional single-channel seismic measurements, wherein at least one seismic source and hydrophone devices are towed behind a vessel, and a pair of submerged deflectors are used and which, as the vessel moves, seek to move in a direction transverse to the vessel's direction of travel. Fastened between the deflectors is a wire which limits the spacing between the deflectors. Along the wire there are also mounted thereon hydrophone devices which in relation to the spacing of the devices have a short lengthwise extent. The devices are connected together by a hydrophone signal cable. An additional signal cable connects the cable to the signal processing equipment on the vessel. The seismic source may be connected to signal equipment on the vessel and located in an area between the vessel and the wire, or at least one of the deflectors may be equipped with a seismic source.

21 Claims, 1 Drawing Sheet

U.S. PATENT DOCUMENTS

| | | |
|---|---|---|
| 6,009,042 A | 12/1999 | Workman et al. |
| 6,498,768 B1 * | 12/2002 | Gjestrum et al. ............. 367/20 |
| 6,590,831 B1 * | 7/2003 | Bennett et al. ............... 367/16 |
| 6,681,710 B2 * | 1/2004 | Semb ......................... 114/253 |
| 6,691,038 B2 * | 2/2004 | Zajac ........................... 367/20 |
| 2002/0064088 A1 * | 5/2002 | Barker ......................... 367/20 |

* cited by examiner

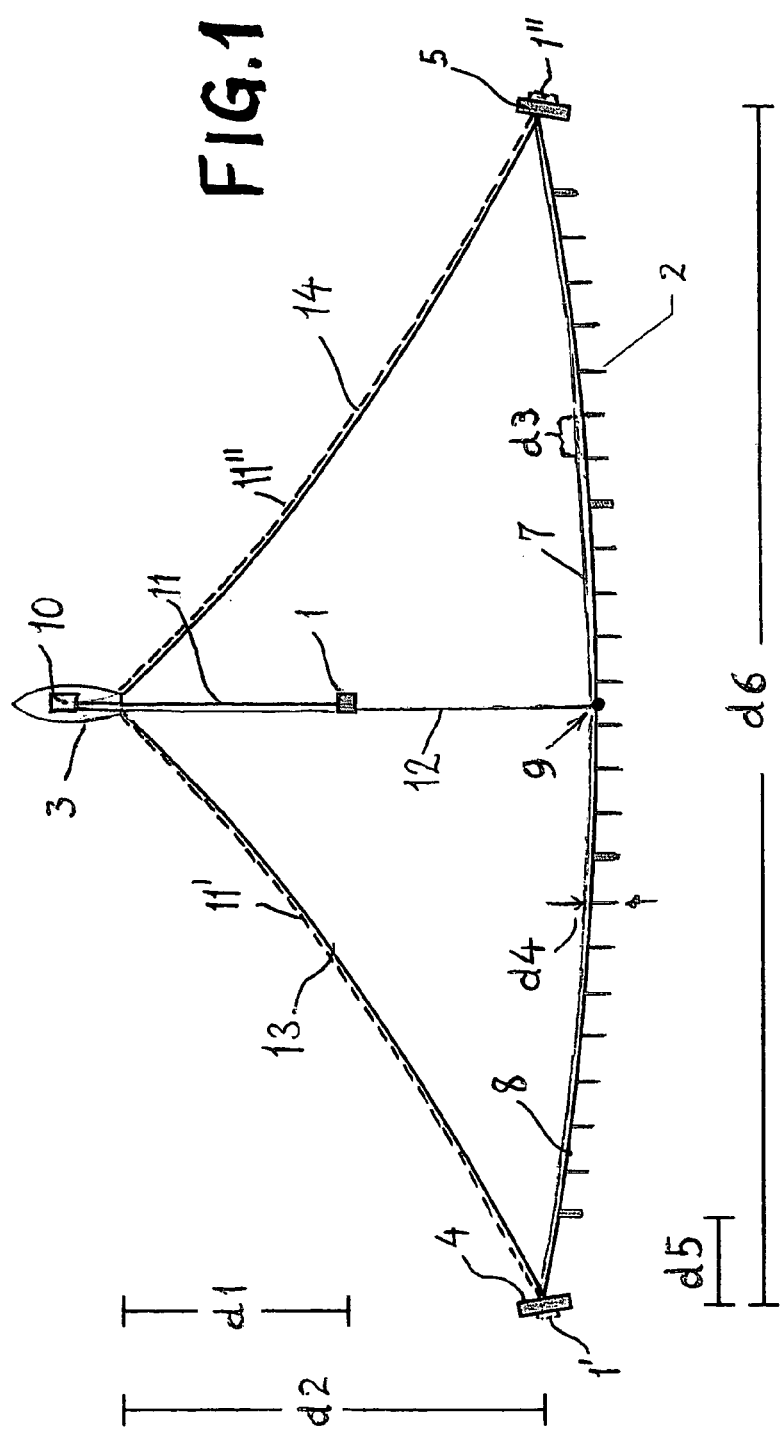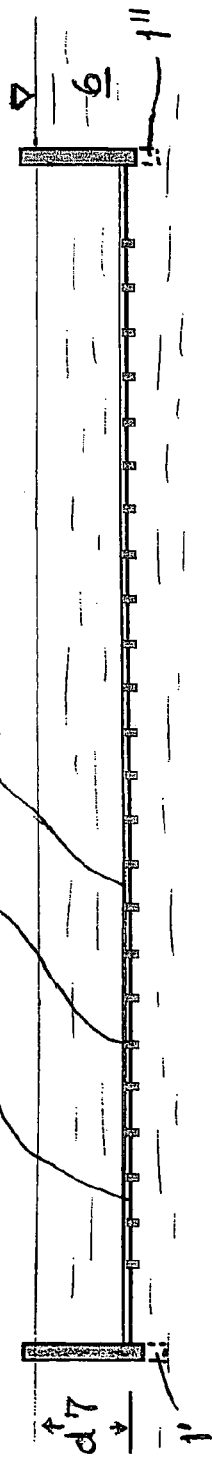

APPARATUS FOR SEISMIC MEASUREMENTS

BACKGROUND OF THE INVENTION

The present invention relates to an apparatus for seismic measurements, wherein at least one seismic source and hydrophone devices are towed behind a vessel, and wherein a pair of deflectors are used that are submerged in the sea and have a means between them designed to ensure that the spacing between the hydrophone devices transverse to the vessel's direction of travel is maintained in that, as the vessel moves, the deflectors seek to move in a direction transverse to the vessel's direction of travel, a wire being fastened between the said deflectors in order to limit the spacing between the deflectors.

DESCRIPTION OF THE RELATED ART

Such deflectors or doors have a function corresponding to the so-called "otters" known from fishing methods, or so-called "trawl doors".

A number of solutions in connection with seismic measurements are previously known.

Norwegian Patent 310128 relates to a system for controlling towed seismic arrays by varying the length of the wire between the vessel and deflectors connected to one side of the towing vessel via, for example, a wire. A number of long, seismic cables are connected to the vessel via towing cables 2, 8, and the seismic cables are kept spaced apart from one another by said deflectors. Such seismic cables traditionally have a length of at least several kilometers, and seismic cables, or streamers, of as much as six kilometers in length are not uncommon. Long cables of this kind contain, for example, up to 480 channel groups and there are, for instance, 16 hydrophones per channel group. This in turn means that the signal processing is complicated, whilst the towing of such long cables in narrow stretches of water, for instance, may be difficult.

U.S. Pat. No. 4,970,696 teaches another way of solving the problem of conducting seismic surveys. Another example is given in U.S. Pat. No. 5,784,335, and U.S. Pat. Nos. 5,913,280, 5,973,995 and 5,835,450 also teach how a plurality of streamers of substantial length can be towed simultaneously.

Further examples in which deflectors are shown can be seen in U.S. Pat. Nos. 4,958,331 and 4,862,422.

Another solution as described in U.S. Pat. No. 3,581,273 relates to the mounting of equipment including a regular streamer transverse to the direction of travel. However, a solution of this kind generates a great deal of noise and is not very useful in practice.

Yet another example of a method and apparatus for seismic measurements can be seen in U.S. Pat. No. 4,727,956.

SUMMARY OF THE INVENTION

However, the object of the present invention is to provide an apparatus for seismic measurements where it is possible to collect many seismic profiles simultaneously in a manner that is much simpler than when applying conventional techniques, as conventional techniques make great demands on sampling and signal processing. An additional object is that the survey that is to be carried out can be conducted more quickly and more cheaply than has hitherto been known, partly because the searching movements across the whole seismic search area can take place more quickly than was possible earlier.

The present device will be especially useful for collecting three dimensional seismic data in deep water, but will also be useful in operations in shallow waters. Areas of application could be related to geological surveys in connection with petroleum exploration and scientific research studies, and the charting of seabed conditions for geotechnical purposes (anchoring of platforms, planning (design) of pipeline routes, and the mapping of shallow gas).

Today, it is usual to collect many seismic lines or profiles simultaneously when shooting three-dimensional seismic. A plurality of streamers are used, often perhaps as many as 16, and these are towed behind the seismic ship. It is known that these streamers may even be as much as 12 kilometers in length. To keep such streamers spaced apart as parallel as possible, it is known to use deflectors which "divert" out sideways as the vessel moves and thus draw tight an interspacer wire or the like for the cables.

However, one of the objects of the present invention has been to develop a simple "streamer" which to the greatest extent possible is towed at right angles to the direction of travel.

According to the invention, the apparatus is characterised in that spaced apart and mounted on said wire are hydrophone devices which in relation to the spacing of the devices have a short lengthwise extent transverse of across the wire in the vessel's direction of travel, and wherein the devices are connected together by a hydrophone signal cable which extends along the said wire;

that the hydrophone devices consist of short streamers that extend parallel to the vessel's direction of travel and have a lengthwise extent that is 25–400% of the spacing between the streamers;

that each streamer has m hydrophones and where the signals are summed up analogously and form a single-channel hydrophone device;

that a total of n hydrophone devices are mounted on the cable; and that the apparatus comprises an n-channel sampling device for sampling all the hydrophone devices simultaneously.

According to one embodiment of the apparatus, the seismic source is located between the vessel and said hydrophone signal cable which extends along the wire. Alternatively, a seismic source may be mounted either on one or both deflectors.

In a preferred embodiment, said lengthwise extent is 80% of the spacing between the streamers. In reality, any very short streamers of this kind with a lengthwise extent of 25–400% of the spacing between the streamers will be regarded as individual hydrophone points which extend along said tensioned wire.

It is conceivable that the short streamers may be of a length in the range of 1–25 meters, and that the mutual spacing may be in the range of 1–25 meters.

In a preferred embodiment, the streamers are, for example, 10 meters long and are spaced 12.5 meters apart.

It is advantageous that n>m, although it is possible that n≦m. Typically, m may be an integer between 6 and 24, and n an integer between 12 and 96.

Each streamer has m hydrophones and the signals are summed up analogously and form a single-channel hydrophone device. For example, m is 12. Because each hydrophone device thus forms a single-channel hydrophone device, it will be viewed signalwise as one point.

Advantageously, a total of n hydrophone devices may be mounted on the cable. The apparatus contains an n-channel sampling device for sampling all hydrophone devices simultaneously. In a preferred embodiment, n=24. However, it is also possible that n is 96, for example.

The cable to which the hydrophone devices are attached is, according to one embodiment, connected via an outlet on the signal cable to signal control and processing equipment on board the vessel by means of an additional signal cable that extends to the vessel.

The apparatus described is particularly suitable for seismic measurements in the seabed at a distance downwards that corresponds approximately to the depth of the sea from the surface to the seabed at the measuring site.

The present apparatus would be particularly useful for seismic measurements in the seabed at a distance downwards that is slightly greater than the depth of the sea at the measuring point. This is the case because it is difficult to eliminate the seabed multiple in single-channel data.

These and other embodiments of the invention will be apparent from the attached patent claims, and from the following description with reference to the attached drawings.

BRIEF DESCRIPTION OF THE DRAWINGS

The invention will now be described in more detail with reference to the attached figures.

FIG. 1 is a top view of the principle of the present invention.

FIG. 2 is a rear view in vertical section of the apparatus depicted in FIG. 1.

DESCRIPTION OF THE PREFERRED EMBODIMENTS

FIG. 1 shows a seismic source 1 and hydrophone devices 2 that are towed behind a vessel 3. A pair of deflectors or "doors" 4, 5 are used and these are submerged in the sea 6. As the vessel 3 moves, these deflectors seek to move in a direction transverse to the vessel's direction of travel. A wire 7 is fastened between the deflectors 4, 5 at a level d7 below the surface of the sea, and limits the spacing d6 between the deflectors 4, 5. Attached to the wire 7 is a cable 8 and spaced apart therealong are hydrophone devices 2, which in relation to the spacing between the devices have a short lengthwise extent d4. The seismic source 1, as shown in FIG. 1, is located between the vessel 3 and the cable 8, preferably at a distance d1 from the vessel and at a distance d2−d1 from the cable 8. The seismic source 1 is supplied with power via a separate power cable 11.

The signal cable 8 on which the hydrophone devices 2 are mounted is connected via an outlet 9 on the cable 8 to signal and processing equipment 10 on board the vessel 3 via an additional signal cable 12, which is separate from the cable 11 and the source 1, and which extends from the outlet 9 to the vessel 3. The said deflectors 4, 5 are connected to the vessel by a respective tow wire 13, 14. The hydrophone devices 2 consist of short streamers which extend parallel to the vessel's direction of travel and may, for example, have a lengthwise extent that is 0.25–400% of the spacing between the streamers. In the illustrated embodiment, the ratio between the distances d3 and d4 is almost 0.8, and in one specific embodiment the streamers may have a length d4 that is 10 meters, the spacing between the streamers being chosen to be d3 that equals 12.5 meters.

As an alternative or supplement to the seismic source 1, a seismic source 1', 1" can be arranged on one or both of the deflectors 4, 5. If a seismic source is used on both deflectors 4, 5, these can, for example, be operated alternately. Power supply can be provided via cables 11', 11".

However, each streamer 2 of this kind is regarded as an individual hydrophone device as it forms a single-channel hydrophone device equipped with, for example, twelve hydrophones.

A total of n hydrophone devices could be fastened to the cable 8, and the said signal control and processing equipment on board the vessel, which both triggers the seismic source 1 and receives signals from the said n hydrophone devices, could contain an n-channel sampling device so as to be capable of sampling all hydrophone devices simultaneously. In a preferred, but for the invention non-limiting embodiment, n=24.

It will be seen from FIG. 1 that the hydrophone devices that are closest to a respective deflector 4, 5 are at a distance d5. In the illustrated example, which should by no means be regarded as limiting the scope of the invention, d1 is 250 meters, d2 is 300 meters, d3 is 12.5 meters, d4 is 10 meters, d5 is 20 meters, d6 is 327.5 meters and d7 is 3 meters. The present invention is also characterised in that in reality it can be used for all types of seismic surveys, but, as previously mentioned, will be especially suitable for measurements in a seabed at a distance downwards that is approximately equal to the depth of the sea from the surface to the seabed at the measuring point. If, for example, the depth of the sea is 100 meters, the penetration depth into the seabed will initially be about 100 meters.

Since seismic measurements can be conducted over a relatively wide area, whilst the "tail" of costly streamers that are known in connection with the standard solutions is avoided, the present invention will be suitable for measurements in narrow stretches of water, although it can also be used in more open waters. A suitable towing speed for the vessel would be, for example, 5 knots.

In contrast to the conventional measuring methods which require large and expensive towing vessels, very costly measuring equipment on board and expensive streamers, the present invention is characterised in that it uses short streamers, and it can also be used with much smaller vessels than can be used with conventional techniques. Although the present invention can be used in shallow waters, it could also advantageously be used in very deep waters. In deep water, the so-called seabed multiple will arrive relatively late, and one example of where the device may be used is at a depth of 1500 meters, which is found across large areas of the so-called "Vørings Plateau" off the coast of central Norway. In this case, the seabed multiple will arrive after about four seconds. Assuming an average speed of about 2000 m/s in the sediment pack, it will be possible to map geological layers down to a depth of about 3.5 kilometers, i.e., about 2 kilometers below the seabed, with an apparatus according to the invention.

The present invention provides a simple collecting system for seismic data picked up by the streamers 2, and where simple, so-called post-stacking processing routines are also made possible. The present invention also makes it possible to collect many lines or profiles at the same time, and it will be possible to obtain a high resolution by means of dense trace coverage and a high collecting frequency, which also means that there will be a high frequency content in the data.

The invention claimed is:

1. An apparatus for seismic measurements, comprising:
a seismic source;
a plurality of streamers having hydrophone devices,
said seismic source and said plurality of streamers being towed behind a vessel;
a pair of deflectors submerged in the sea;
a wire fastened between the deflectors, said wire limiting spacing between and outward movement of the deflectors transverse to a direction of travel of the vessel as the vessel moves,
said plurality of streamers mounted on said wire with a spacing therebetween in a range of 1 to 25 meters,
said wire when stretched between the deflectors causing the streamers attached thereto to maintain a set spacing,
said plurality of streamers extending parallel to the vessel's direction of travel and having a lengthwise extent that is 25% to 400% of the spacing between the steamers with a minimum lengthwise extent of 25 cm and a maximum lengthwise extent of 100 meters;
a hydrophone signal cable connecting said plurality of streamers together, said hydrophone signal cable extending along said wire,
each streamer having m hydrophones,
analog signals from said m hydrophones being summed up,
the m hydrophone devices of each streamer forming a single-channel hydrophone device,
a total of n streamers being mounted on the hydrophone signal cable, thereby forming a total of n single channel hydrophone devices; and
an n-channel sampling device for sampling all the n single-channel hydrophone devices simultaneously.

2. An apparatus as disclosed in claim 1, wherein,
the seismic source is located between the vessel and the hydrophone signal cable that extends along the wire.

3. An apparatus as disclosed in claim 1, wherein, a seismic source is located on one or both of the deflectors.

4. An apparatus as disclosed in claim 1, wherein, said lengthwise extent is 80% of said spacing between the streamers within a range of 80 cm to 20 meters.

5. An apparatus as disclosed in claim 1, wherein, the streamers have a length in the range of 1–25 meters.

6. An apparatus as disclosed in claim 1, wherein, n>m.

7. An apparatus as disclosed in claim 1, wherein, n≦m.

8. An apparatus as disclosed in claim 1, wherein,
m is an integer between 6 and 24; and
n is an integer between 12 and 96.

9. An apparatus as disclosed in claim 1, wherein,
n=24; and
m=12.

10. An apparatus as disclosed in claim 1, wherein, the signal cable, to which the n single channel hydrophone devices are connected, has an outlet connected by an additional signal cable to signal control and processing equipment on board the vessel.

11. An apparatus for seismic measurements as disclosed in claim 1, configured to provide for seismic measurements downwards into a seabead by a distance being approximately equal to the depth of the sea from the sea surface to the seabed at a specific measuring point thereat.

12. An apparatus as disclosed in claim 4, wherein, the streamers have a length in the range of 12.5 meters.

13. An apparatus as disclosed in claim 7, wherein,
the seismic source is one of i) located between the vessel and the wire that extends between the deflectors, and ii) is located on at least one of the deflectors,
m is an integer between 6 and 24; and
n is an integer between 12 and 96.

14. An apparatus as disclosed in claim 3, wherein,
the seismic source is located externally on one of the deflectors;
n=24; and
m=12.

15. An apparatus as disclosed in claim 1, wherein,
seismic sources are located externally on each of the deflectors.

16. An apparatus for seismic measurements, comprising a seismic source and a plurality of streamers having hydrophone devices, said seismic source and said plurality of streamers being towable behind a vessel, a pair of deflectors submerged in the sea, and a wire being fasted between the deflectors to limit spacing between and outward movement of the deflectors transverse to a direction of travel of said vessel as the vessel moves, said wire when stretched between the deflectors causing streamers attached thereto to maintain a set spacing,
wherein hydrophone devices are mounted on said wire with a spacing therebetween in the range of 1–25 meters,
wherein said plurality of streamers extend parallel to the vessel's direction of travel and have a lengthwise extent that is 80% of the spacing between the streamers with a minimum lengthwise extent of 80 cm and a maximum lengthwise extent of 20 meters,
wherein the streamers are connected together by a hydrophone signal cable which extends along the said wire,
wherein each streamer has m hydrophones and where analog signals from said m hydrophones are summed up, the m hydrophone devices of each streamer thereby forming a single-channel hydrophone device,
wherein a total of n streamers are mounted on the cable, thereby forming a total of n single-channel hydrophone devices, and
wherein the apparatus comprises an n-channel sampling device for sampling all of the n single-channel hydrophone devices simultaneously.

17. The apparatus as disclosed in claim 16, wherein the seismic source is one of i) located between the vessel and the wire that extends between the deflectors, and ii) located on at least one of the deflectors.

18. An apparatus for seismic measurements, comprising a seismic source and a plurality of streamers having hydrophone devices, said seismic source and said plurality of streamers being towable behind a vessel, a pair of deflectors submerged in the sea, and a wire being fasted between the deflectors to limit the spacing between and outward movement of the deflectors transverse to a direction of travel of said vessel as the vessel moves, said wire when stretched between the deflectors causing streamers attached thereto to maintain a set spacing in,
wherein said plurality of streamers are mounted on said wire with a spacing therebetween in the range of 1.25–31.25 meters,
wherein said plurality of streamers extend parallel to the vessel's direction of travel and have a lengthwise extent that is 80% of the spacing between the streamers with minimum lengthwise extent of 1 meter and a maximum lengthwise extent of 25 meters, wherein the streamers are connected together by a hydrophone signal cable which extends along the said wire, wherein each streamer has m hydrophones and where analog signals from said m hydrophones are summed up, the m hydrophone devices of each streamer thereby forming a single-channel hydrophone device, wherein a total of n streamers are mounted on the cable, thereby forming a total of n single-channel hydrophone devices, and wherein the apparatus comprises an n-channel sampling device for sampling all of the n single-channel hydrophone devices simultaneously.

19. The apparatus as disclosed in claim 18, wherein the seismic source is one of i) located between the vessel and the wire that extends between the deflectors, and ii) located on at least one of the deflectors.

20. An apparatus for seismic measurements, comprising a seismic source and a plurality of streamers having hydrophone devices, said seismic source and said plurality of streamers being towable behind a vessel, a pair of deflectors submerged in the sea, and a wire being fasted between the deflectors to limit the spacing between and outward movement of the deflectors transverse to a direction of travel of said vessel as the vessel moves, said wire when stretched between the deflectors causing streamers attached thereto to maintain a set spacing in, wherein said plurality of streamers are mounted on said wire with a spacing therebetween in the range of 1–25 meters, wherein said plurality of streamers that extend parallel to the vessel's direction of travel and have a lengthwise extent that is in the range of 1–25 meters, wherein the streamers are connected together by a hydrophone signal cable which extends along the said wire, wherein each streamer has m hydrophones and where analog signals from said m hydrophones are summed up, the m hydrophone devices of each streamer thereby forming a single-channel hydrophone device, wherein a total of n streamers are mounted on the cable, thereby forming a total of n single-channel hydrophone device, and wherein the apparatus comprises an n-channel sampling device for sampling all of the n single-channel hydrophone devices simultaneously.

21. The apparatus as disclosed in claim 20, wherein the seismic source is one of i) located between the vessel and the wire that extends between the deflectors, and ii) located on at least one of the deflectors.

* * * * *